(12) United States Patent
Topf

(10) Patent No.: US 11,548,615 B2
(45) Date of Patent: Jan. 10, 2023

(54) SYSTEM AND METHOD FOR JOINING STRUCTURES WITH LARGE THERMAL EXPANSION DIFFERENCES

(71) Applicant: THE BOEING COMPANY, Chicago, IL (US)

(72) Inventor: Richard Topf, Orange, CA (US)

(73) Assignee: THE BOEING COMPANY, Chicago, IL (US)

( * ) Notice: Subject to any disclaimer, the term of this patent is extended or adjusted under 35 U.S.C. 154(b) by 254 days.

(21) Appl. No.: 16/839,746

(22) Filed: Apr. 3, 2020

(65) Prior Publication Data

US 2021/0309345 A1    Oct. 7, 2021

(51) Int. Cl.
| | |
|---|---|
| *B64C 3/26* | (2006.01) |
| *B64C 3/18* | (2006.01) |
| *B64C 3/00* | (2006.01) |
| *B64C 9/00* | (2006.01) |

(52) U.S. Cl.
CPC ............. *B64C 3/26* (2013.01); *B64C 3/00* (2013.01); *B64C 3/185* (2013.01); *B64C 3/187* (2013.01); *B64C 9/00* (2013.01)

(58) Field of Classification Search
CPC .. B64C 3/26; B64C 3/00; B64C 3/185; B64C 3/187; B64C 9/00; B64C 1/12
See application file for complete search history.

(56) References Cited

U.S. PATENT DOCUMENTS

| | | | |
|---|---|---|---|
| 2016/0318597 A1* | 11/2016 | Kent | ......................... B64C 3/18 |
| 2017/0036751 A1 | 2/2017 | Topf et al. | |
| 2021/0107621 A1* | 4/2021 | Whitmer | ................. B64C 3/187 |

* cited by examiner

*Primary Examiner* — Rodney A Bonnette
(74) *Attorney, Agent, or Firm* — Alston & Bird LLP

(57) ABSTRACT

A system and method are provided that enable joined materials to expand and contract at different rates while maintaining a structurally sound connection. A system for joining structures with differing coefficients of thermal expansion includes: a first structural element of a first material having a first coefficient of thermal expansion (CTE); a plurality of flexures each defining a first portion and a second portion and attached at the first portion to the first structural element; and a second structural element of a second material having a second CTE, where the second structural element is attached to the second portion of each of the plurality of flexures, where in response to relative movement between the first structural element and the second structural element, the plurality of flexures bend to accommodate the relative movement.

20 Claims, 5 Drawing Sheets

SYSTEM AND METHOD FOR JOINING STRUCTURES WITH LARGE THERMAL EXPANSION DIFFERENCES

TECHNOLOGICAL FIELD

A system and method are provided for joining structures that have large differences between their coefficients of thermal expansion, and more particularly, to a method that enables joined materials to expand and contract at different rates while maintaining a structurally sound connection.

BACKGROUND

Vehicles that travel at supersonic and hypersonic speeds need an airframe designed to withstand thermal loads as well as structural loads. This is particularly true of airframes designed with hot structure, whereby a portion of the vehicle structure is allowed to get hot as opposed to a more traditional approach of using thermal protection materials on a vehicle surface. Structural configurations for joining aircraft skin to an airframe may not be suitable for a hot structure as the skin may expand at a different rate than the airframe, and traditional joining methods cannot accommodate the strain induced by thermal expansion, particularly along the chord of a wing.

Typically, hypersonic vehicles are designed with parasitic thermal protection systems on the skins of the vehicle that minimize internal structure temperature, thus enabling a more traditional structural approach. These thermal protection systems add weight to the aircraft and also add cross-sectional area to the aircraft, particularly to the wings, which increase drag forces at higher speeds. A hot structure wing, whereby the wing is allowed to get hot from aerodynamic heating would thus be much more efficient due to the lower weight and reduced thickness. However, the thermal growth of the aircraft skin, particularly in the wing, at extreme temperatures, would overstress a traditional structural connection.

BRIEF SUMMARY

A system and method are provided in accordance with an example embodiment in order to join structures having large differences between their coefficients of thermal expansion. More specifically, a system and method are provided that enable joined materials to expand and contract at different rates while maintaining a structurally sound connection. Embodiments described herein provide a system for joining structures with differing coefficients of thermal expansion including: a first structural element of a first material having a first coefficient of thermal expansion (CTE); a plurality of flexures each defining a first portion and a second portion and attached at the first portion to the first structural element; and a second structural element of a second material having a second CTE, where the second structural element is attached to the second portion of each of the plurality of flexures, where in response to relative movement between the first structural element and the second structural element, the plurality of flexures bend to accommodate the relative movement.

According to an example embodiment, the first structural element defines a first major surface, the second structural element defines a second major surface, and the first major surface is substantially perpendicular to the second major surface. The plurality of flexures bend in a direction along the first major surface. Each of the plurality of flexures defines an eyelet proximate the second portion of the flexure, where the system includes a plurality of fasteners, and where each fastener secures the second structural element to the flexure through the eyelet. According to an example embodiment, the first structural element is a rib of a wing or a control surface, and the second structural element includes a skin of the wing or the control surface. A length between the first portion and the second portion of the plurality of flexures increases as a distance from a front of the wing or the control surface increases. According to some embodiments, each of the plurality of flexures defines a webbing between the first portion and the second portion, where a thickness of the webbing decreases as a distance from a front of the wing or the control surface increases.

Embodiments provided herein may include a webbing defined between the first portion and the second portion of each flexure, where the webbing is thinner in a direction of bending of the flexures than in a direction perpendicular to the direction of bending. The plurality of flexures resist bending in two of three mutually orthogonal axes. Embodiments may include a third structural element, where the third structural element is joined to the first structural element with a spline connection, and where the spline connection between the first structural element and the third structural element permits relative movement between the first structural element and the third structural element along a single axis. The first structural element of an example embodiment includes a rib of a wing or control surface, the second structural element includes a skin of the wing or the control surface, and the third structural element includes a spar of the wing or the control surface. The flexures enable relative movement between the skin of the wing or the control surface and the rib of the wing or the control surface in a direction parallel to an axis along which the rib extends, and where the spline connection enables relative movement between the rib and the spar along an axis along which the spar extends.

Embodiments disclosed herein provide a method for joining structures with different coefficients of thermal expansion (CTE) with methods including: securing a first structural element having a first CTE to a first portion of a plurality of flexures, where the first structural element defines a first major surface in a first plane; securing a second structural element having a second CTE to a second portion of the plurality of flexures, where the second structural element defines a second major surface in a second plane orthogonal to the first plane; and enabling movement of the first structural element relative to the second structural element through bending of the flexure, where bending of the flexure is in a third plane orthogonal to the first plane and the second plane. According to an example embodiment, methods include securing the first structural element to a third structural element with a spline connection, where the spline connection enables relative movement between the first structural element and the third structural element along an axis along which the third structural element extends. The first structural element of an example embodiment includes a rib of a wing or a control surface, the second structural element includes a skin of the wing or the control surface, and the third structural element includes a spar of the wing or the control surface.

Embodiments disclosed herein provide a flexure for joining structures with different coefficients of thermal expansion (CTE) including: a first portion configured to attach to a first structural element having a first major surface defining a first plane; a second portion configured to attach to a second structural element having a second major surface defining a second plane; and a webbing defined between the first portion and the second portion, where the webbing has a third major surface defining a third plane, where the first plane, second plane, and third plane are each mutually orthogonal. According to an example embodiment, the first structural element includes a rib of a wing or a control surface, where the second structural element includes a skin of the wing or the control surface. Each of the plurality of flexures defines an eyelet proximate the second portion of the flexure, where a fastener secures the skin of the wing or the control surface to the flexure through the eyelet. The flexure enables relative movement between the skin of the wing or the control surface and the rib of the wing or the control surface in a direction parallel to an axis along which the rib extends. The flexure resists bending in the first plane and the second plane, and is configured to bend in the third plane.

BRIEF DESCRIPTION OF THE DRAWINGS

Having described certain examples of the present disclosure in general terms above, reference will now be made to the accompanying drawings, which are not necessarily drawn to scale and wherein.

DETAILED DESCRIPTION

Figure 1:
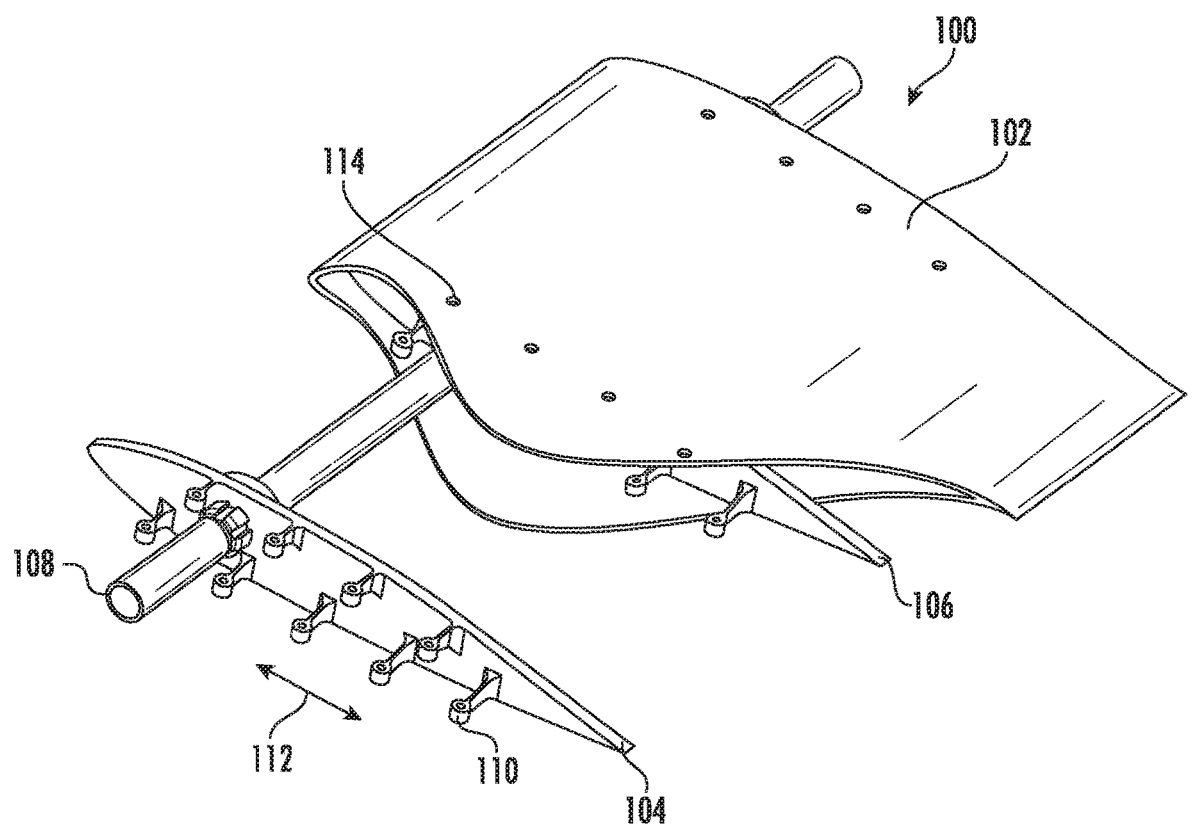
FIG. 1 illustrates a cut-away section of a wing flap according to an example embodiment of the present disclosure.

Some examples of the present disclosure will now be described more fully hereinafter with reference to the accompanying drawings, in which some, but not all examples of the present disclosure are shown. Indeed, the present disclosure may be embodied in many different forms and should not be construed as limited to the examples set forth herein; rather, these examples are provided so that this disclosure will satisfy applicable legal requirements. Like numbers refer to like elements throughout.

Embodiments described herein are described with respect to methods of joining materials for an aircraft; however, embodiments may be implemented in a variety of fields. For example, embodiments may be utilized in conjunction with joining of a building skin to the structure of a building or joining the outer material of a tank to a structural frame of the tank. Essentially, methods described herein can benefit any joining of structures where the joined structures have differing coefficients of thermal expansion and are used in environments where the differences lead to non-negligible differences in the amount of expansion of the materials. Embodiments are particularly useful for joining the skin of an aircraft to the airframe of an aircraft, and more specifically for aircraft designed for supersonic or hypersonic speeds, where the aircraft skin may be heated by virtue of the speed of the aircraft through the air.

Embodiments of the present disclosure provide a novel mechanism for securing materials together when there is a large difference in thermal growth between them, such as a first structural element and a second structural element, where both structural elements have substantially different coefficients of thermal expansion. According to specific embodiments disclosed herein, methods and systems are particularly well suited for attaching aircraft skin to an aircraft frame to accommodate for thermal growth of the aircraft skin relative to the frame due to aerodynamic heating at high speeds. Embodiments may also be well suited to attaching aircraft skin to an aircraft frame to accommodate thermal growth of the aircraft frame relative to the aircraft skin, which may occur if the aircraft skin is of a material such as a ceramic composite that has a low coefficient of thermal expansion while the aircraft frame may be metal (e.g., an aluminum alloy) and have a much higher coefficient of thermal expansion.

While material systems have been developed for dealing with high and low temperatures within major structural parts, joining of these materials can be problematic. Described herein are methods and systems using flexures attached to a first structural element, such as a rib of a wing or a control surface to attach a second structural element, such as aircraft skin. The first structural element or rib is translatable along a third structural element, such as a spar to form a connection between the aircraft skin and the frame of the aircraft. These methods and systems can be employed in the fuselage or body of an aircraft, but are particularly well suited to wings and control surfaces that experience substantial heating during supersonic and hypersonic flight.

The present disclosure provides methods and systems for joining first and second structural elements together when the first and second structural elements have differing coefficients of thermal expansion. An example includes attaching an aircraft frame member such as a rib to aircraft skin to enable differential thermal growth between the materials while maintaining structurally sound attachment. One embodiment disclosed herein relates to attaching aircraft skin to a frame of a wing or control surface of the aircraft as the wings and control surfaces of an aircraft experience substantial aerodynamic heating and provide an extreme case where the disclosed methods and systems may be particularly beneficial. However, it is understood that embodiments may be employed in any of a variety of structural connections in an aircraft or other structure where large differences in coefficients of thermal expansion exist, and/or where temperature exposure to different structural elements are significant.

Embodiments described herein employ a plurality of flexures with flexibility along a single direction allowing for thermal growth of a first structural element relative to a second structural element. In the example embodiment of a wing or a control surface of an aircraft, the flexures have flexibility in a chordwise direction, along a rib (e.g., a first structural element) of the wing or control surface, allowing for thermal growth of the rib in the chordwise direction relative to the skin (e.g., second structural element) of the wing or control surface. The geometry of the flexures is such that there is significantly more stiffness in the vertical and span-wise directions (i.e., normal to a wing or control surface and along the length of a wing or control surface) while allowing flexibility in the chordwise direction (i.e., substantially parallel to a direction of flight). A plurality of such flexures are employed along a rib of a wing or control surface to distribute the load exerted by the thermal growth and to provide a robust connection between the rib and the aircraft skin through the flexures. Flexures may be made of a variety of materials and the specific material may be chosen based on the specific application. For example, in high temperature applications (e.g., for flexures in a wing of a hypersonic aircraft), Inconel or titanium alloys may be employed as they have high elastic moduli and high temperature resilience. In lower temperature applications (e.g., for flexures in a wing of a supersonic aircraft), aluminum alloys could be employed using alloys having a high fatigue strength.

FIG. 1 illustrates a cut-away section of a wing flap 100 or control surface according to an example embodiment of the present disclosure. As shown, a second structural element or skin 102 of the wing flap 100 is attached over a frame that includes first structural elements or ribs 104, 106 and a third structural element or spar 108. Conventionally, aircraft skin is attached to the aircraft frame directly with rivets. For example, a rib may include a flange whereby the skin is riveted to the flange of the rib. Embodiments described herein do not attach the skin directly to the rib, but instead use flexures 110, where the skin is attached to flexures and the flexures are attached to the rib 104. The rib 104 is generally disposed in a position that is substantially perpendicular to the wing flap 100. While the wing flap 100 has a airfoil shape rather than a strictly planar shape, the wing flap generally defines a plane in which the wing flap or wing lies. The rib 104 is substantially perpendicular to the plane in which the wing or wing flap 100 lies.

As the temperature of the skin 102 of the aircraft increases, such as during supersonic or hypersonic flight, the skin will grow at a different rate than the rib 104 according to their respective coefficients of thermal expansion. The flexures 110 are designed to accommodate this growth in a direction along the chord of the wing, as indicated by arrow 112. The skin 102 of the aircraft is affixed to the flexures 110 by fasteners through holes 114 in the skin 102 and through eyelets 116 of the flexures 110, which are more clearly visible in FIG. 2 described further below. In an example embodiment in which the skin 102 has a higher coefficient of thermal expansion than the rib 104, as the skin grows in the direction of the chord, the location of the holes 114 in the skin move, and the flexures 110 bend in the direction of the chord (arrow 112). Similarly, in an example embodiment in which the rib 104 has a higher coefficient of thermal expansion, the rib grows in the direction of the chord at a rate faster than that of the skin 102 having a lower coefficient of thermal expansion, and the flexures may bend to maintain alignment of the eyelet 116 with the corresponding hole 114 in the skin.

Figure 2:
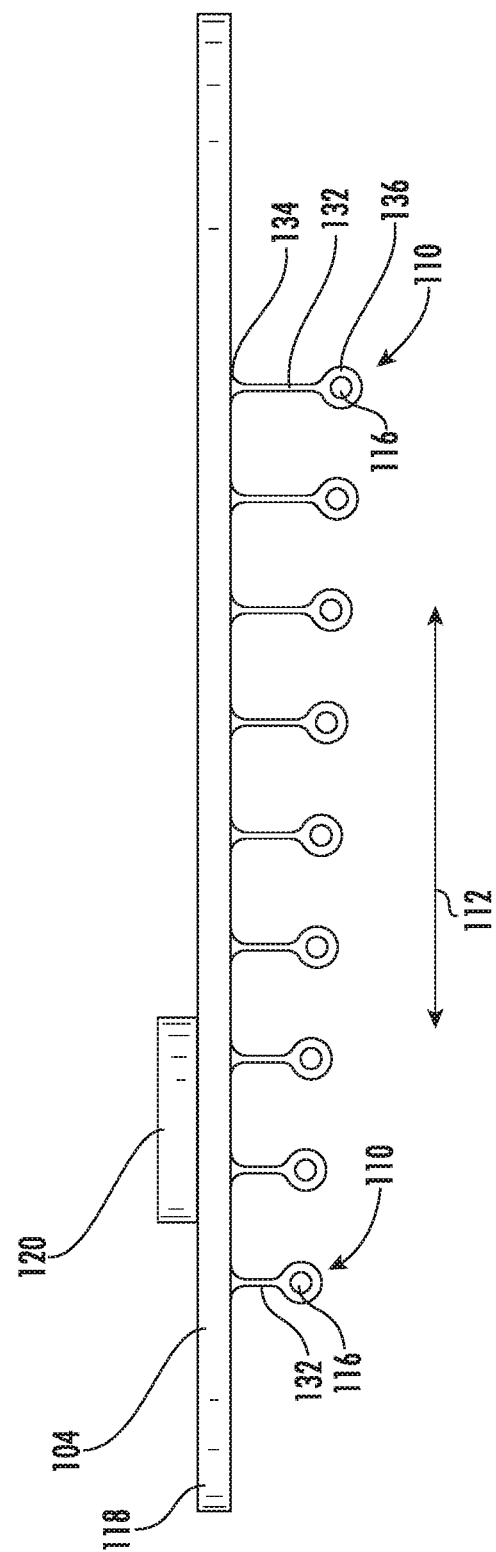
FIG. 2 illustrates a first structural element of a rib of the wing flap of FIG. 1 with a plurality of flexures according to an example embodiment of the present disclosure.

FIG. 2 further illustrates the flexures 110 that extend from the rib 104 including a first portion 134 and a second portion 136, where eyelets 116 are defined within the second portion and the flexure is attached to the rib at the first portion. The flexures 110 extend between the first portion 134 and the second portion 136 with a webbing 132 defined between them. As shown, the flexures 110 increase in length from a front 118 of the rib 104 which corresponds to the front of the wing or control surface. The length is increased by a longer webbing 132 portion between the first portion 134 and the second portion 136. The flexures 110 increase in length based on the degree to which they need to bend to accommodate movement of the aircraft skin, with the front 118 of the rib 104 being fixed relative to the aircraft skin. Thus, the shortest flexure 110 is proximate the front 118 of the rib 104, while the flexures increase in length as they become further from the front of the rib. The flexures 110 closest to the front 118 of the rib 104 experience the least amount of bending due to thermal expansion growth as they are closest to the fixed point between the aircraft skin 102 and the rib 104. As the distance from the fixed point increases, the amount of bend or flex of the flexure 110 increases to accommodate the greater displacement of the hole 114 of the skin 102 from its original location at ambient conditions on the ground.

According to an example embodiment, the skin 102 material may have a low coefficient of thermal expansion, such as a ceramic matrix composite, with the internal rib 104 having a much higher coefficient of thermal expansion, such as a metal. Fasteners may engage each flexure 110 to attach the skin 102 to the substructure rib 104. When exposed to a high temperature environment, the metal parts expand substantially more than the skin. The flexures allow for the growth in length by bending in their weakest direction—along the direction of the chord arrow 112.

Figure 3:
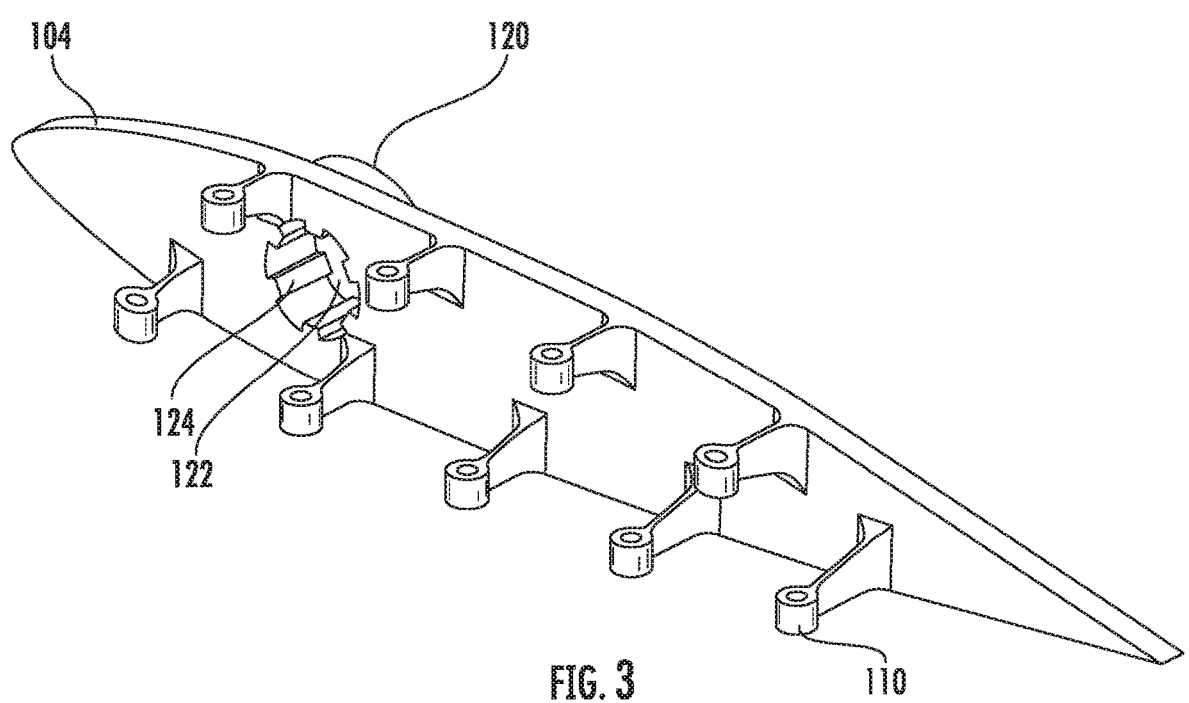
FIG. 3 illustrates another view of the first structural element of a rib of the wing flap of FIG. 1 according to an example embodiment of the present disclosure.
Figure 4:
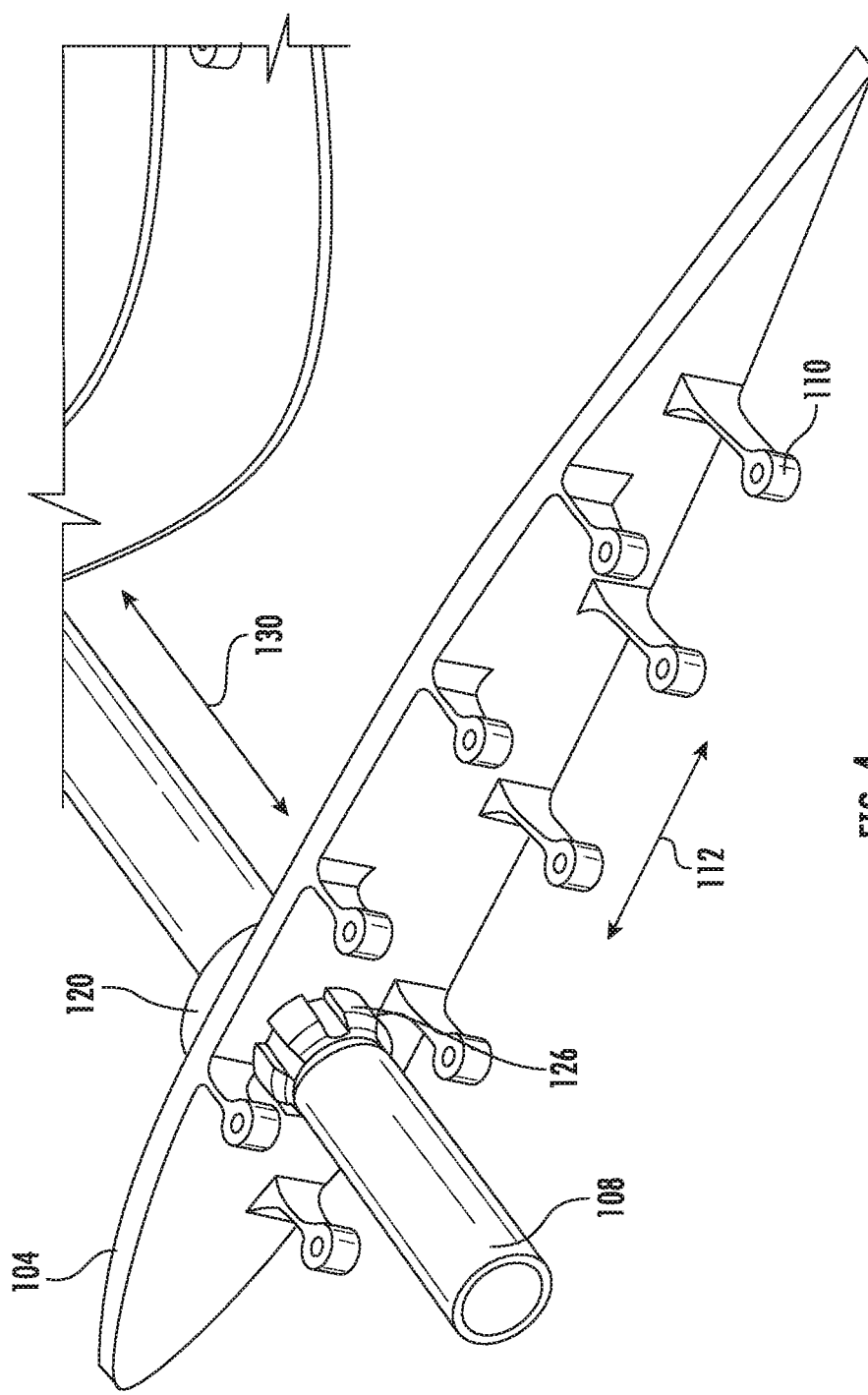
FIG. 4 illustrates the first structural element of a rib of the wing flap of FIG. 1 engaged with the third structural element of a spar of the wing flap according to an example embodiment of the present disclosure.
Figure 5:
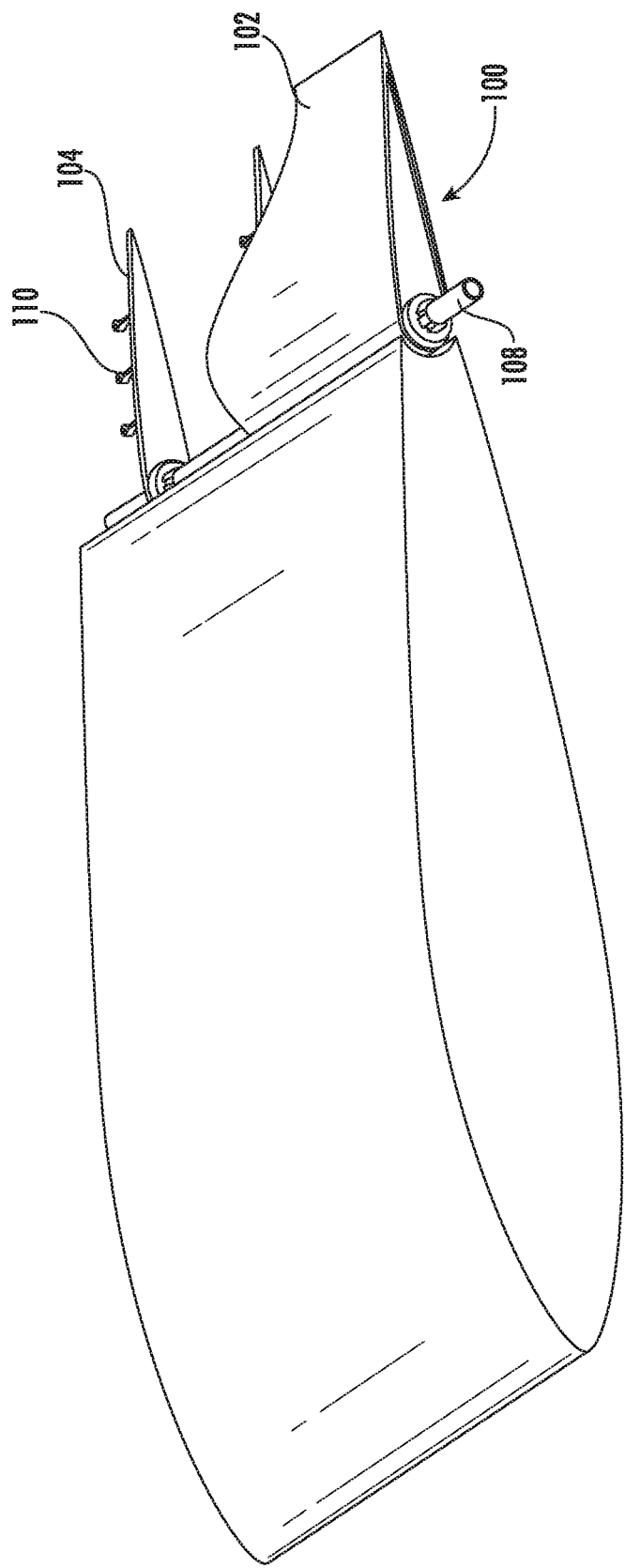
FIG. 5 illustrates a wing including a wing flap configured with flexures attaching the first structural element to the second structural element according to an example embodiment of the present disclosure.

FIG. 2 also illustrates the spar connection 120 where the rib 104 connects to the spar 108 of the wing or control surface. FIG. 3 illustrates a perspective view of the rib 104 in which the flexures 110 and the spar connection 120 are visible. The spar connection 120 of the illustrated embodiment includes a sliding spline type connection, where an aperture 122 defined by the spar connection 120 of the rib 104 includes interface elements 124, configured to engage corresponding interface elements on the spar, illustrated further in FIG. 4. As shown in FIG. 4, the spar 108 extends through the spar connection 120 of the rib 104. The interface elements 124 of the spar connection interface with corresponding interface elements 126 of the spar forming a spline-type connection to preclude rotation of the rib 104 about a longitudinal axis along which the spar 108 extends, while enabling movement between the rib and the spar along the axis of the spar, illustrated by arrow 130. This allowable movement of the rib 104 along the spar 108 enables expansion of the spar relative to the skin and expansion of the skin relative to the spar in the direction of the highest thermal expansion growth (along arrow 130), while the rib has the highest coefficient of thermal expansion growth in a direction substantially perpendicular to that of the spar, along arrow 112.

The flexures 110 are configured to bend only in the direction of arrow 112, while they are substantially rigid in the direction of the axis of the spar, and also substantially rigid in a direction orthogonal to the chord of the wing and the axis of the spar. The flexures enabling flexing only along the direction illustrated by arrow 112 ensure a robust structure for a wing or control surface while experiencing the forces exerted on the wing or control surface by air during flight. Similarly, the spline-type connection between the spar 108 and the rib 104 does not compromise stability or rigidity of the wing or control surface, such that a wing or control surface employing embodiments of the present disclosure can withstand the substantial forces exerted on the wing or control surface during flight, while also permitting thermal expansion of the skin 102 of the wing and/or the rib 104 and the spar 108.

Embodiments of the present disclosure may be tailored to specific aircraft designs and combinations of materials used for the aircraft skin and frame structure. The stresses imparted to the skin by bending of the flexures can be reduced, e.g., minimized, and equalized based on the size and spacing of the flexures. Using longer flexures where the distance between the rib 104 to the eyelet 116 requires less force to impart a bend to the flexure, which may be desirable in applications where the differences in coefficients of thermal expansion between the skin material and the frame or rib material are large. The flexures 110 bend most easily against the thinnest part of the flexure between the rib 104 and the eyelet 116, where the bend direction is along the chord of the wing represented by arrow 112.

Referring back to FIG. 2, the flexures 110 are shown as different lengths from the leading edge of the wing to the tail of the wing. The flexures 110 proximate the front of the wing experience less flexing and movement such that the flexures are shorter in their distance between the rib 104 and the eyelet 116. The further the flexure is from the leading edge, the greater the degree of expansion such that the flexures are longer and enable a greater amount of bend in the flexure to accommodate the greater degree of relative expansion. While the flexures are shown as different lengths, embodiments may optionally include flexures of the same length, where the degree of bending of each flexure may be adjusted by the thickness of the webbing 132 of the flexures in a dimension perpendicular to the bending direction. The webbing 132 may be thicker for flexures that are to bend less, such as the flexures closest to the leading edge of the wing or control surface, while the webbing of the flexures becomes thinner corresponding to the distance of the flexures from the leading edge.

The skin 102 of the wing or control surface may be secured to the flexures 110 by fasteners through a hole 114 of the skin and an eyelet 116 of a corresponding flexure. The fasteners may include rivets or threaded fasteners; however, the fasteners permit some degree of relative movement between the flexure 110 and the skin 102 as the bending of a flexure causes at least a very small amount of rotation between the hole 114 and the eyelet 116. The fasteners may further permit thermal growth of the skin 102 and/or the flexure 110, such as by being of a material that has a similar coefficient of thermal expansion as the flexure.

Embodiments provided herein reduce or eliminate the need for insulation on the surface of the aircraft by enabling the aircraft to be heated by the air at supersonic or hypersonic speeds, while accounting for the thermal expansion experienced from the heating of the aircraft. Further, embodiments may reduce or eliminate the need for ribs with flanges to which the skin of the aircraft is attached, thereby potentially reducing the weight of the aircraft.

In some examples, some of the operations above may be modified or further amplified. Furthermore, in some examples, additional optional operations may be included. Modifications, amplifications, or additions to the operations above may be performed in any order and in any combination.

Many modifications and other examples of the present disclosure set forth herein will come to mind to one skilled in the art to which the present disclosure pertains having the benefit of the teachings presented in the foregoing descriptions and the associated drawings. Therefore, it is to be understood that the present disclosure is not to be limited to the specific examples disclosed and that modifications and other examples are intended to be included within the scope of the appended claims. Moreover, although the foregoing descriptions and the associated drawings describe examples in the context of certain combinations of elements and/or functions, it should be appreciated that different combinations of elements and/or functions may be provided by alternative examples without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purpose of limitation.

That which is claimed:

1. A system for joining structures with differing coefficients of thermal expansion (CTE) comprising:
   a first structural element of first material having a first CTE;
   a plurality of flexures each defining a first portion and a second portion and attached at the first portion to the first structural element; and
   a second structural element of a second material having a second CTE, wherein the second structural element is attached to the second portion of each of the plurality of flexures,
   wherein in response to relative movement between the first structural element and the second structural element, the plurality of flexures bend to accommodate the relative movement,
   wherein each of the plurality of flexures defines a webbing between the first portion and the second portion, and wherein the webbing is thinner in a direction of bending of the flexures than in a direction perpendicular to the direction of bending.

2. The system of claim 1, wherein the first structural element defines a first major surface and the second structural element defines a second major surface, and wherein the first major surface is perpendicular to the second major surface.

3. The system of claim 2, wherein the plurality of flexures bend in a direction along the first major surface.

4. The system of claim 3, wherein each of the plurality of flexures defines an eyelet proximate the second portion of the flexure, wherein the system further comprises a plurality of fasteners, and wherein each fastener secures the second structural element to the flexure through the eyelet.

5. The system of claim 4, wherein the first structural element comprises a rib of a wing or a control surface, and wherein the second structural element comprises a skin of the wing or the control surface.

6. The system of claim 5, wherein a length between the first portion and the second portion of the plurality of flexures increases as a distance from a front of the wing or the control surface increases.

7. The system of claim 5, wherein a thickness of the webbing decreases as a distance from a front of the wing or the control surface increases.

8. The system of claim 1, wherein the plurality of flexures resist bending in two of three mutually orthogonal axes.

9. The system of claim 1, further comprising a third structural element, wherein the third structural element is joined to the first structural element with a spline connection, and wherein the spline connection between the first structural element and the third structural element permits relative movement between the first structural element and the third structural element along a single axis.

10. The system of claim 9, wherein the first structural element comprises a rib of a wing or a control surface, the second structural element comprises a skin of the wing or the control surface, and the third structural element comprises a spar of the wing or the control surface.

11. The system of claim 10, wherein the flexures enable relative movement between the skin of the wing or the control surface and the rib of the wing or the control surface in a direction parallel to an axis along which the rib extends, and wherein the spline connection enables relative movement between the rib and the spar along an axis along which the spar extends.

12. A method for joining structures with different coefficients of thermal expansion (CTE) comprising:
  securing a first structural element having a first CTE to a first portion of a plurality of flexures, wherein the first structural element defines a first major surface in a first plane;
  securing a second structural element having a second CTE to a second portion of the plurality of flexures, wherein the second structural element defines a second major surface in a second plane orthogonal to the first plane; and
  enabling movement of the first structural element relative to the second structural element through bending of the flexure, wherein bending of the flexure is in a third plane parallel to the first plane and the second plane,
  wherein each of the plurality of flexures defines a webbing between the first portion and the second portion, and wherein the webbing is thinner in a direction of bending of the flexures than in a direction perpendicular to the direction of bending.

13. The method for joining structures of claim 12, further comprising:
  securing the first structural element to a third structural element with a spline connection, wherein the spline connection enables relative movement between the first structural element and the third structural element along an axis along which the third structural element extends.

14. The method for joining structures of claim 13, wherein the first structural element comprises a rib of a wing or a control surface, wherein the second structural element comprises a skin of the wing or the control surface, and wherein the third structural element comprises a spar of the wing or the control surface.

15. The method of claim 14, wherein a thickness of the webbing decreases as a distance from a front of the wing or the control surface increases.

16. A flexure for joining structures with different coefficients of thermal expansion (CTE) comprising:
  a first portion configured to attach to a first structural element having a first major surface defining a first plane;
  a second portion configured to attach to a second structural element having a second major surface defining a second plane; and
  a webbing defined between the first portion and the second portion, wherein the webbing has a third major surface defining a third plane, and wherein the first plane, second plane, and third plane, are each mutually orthogonal.

17. The flexure of claim 16, wherein the first structural element comprises a rib of a wing or a control surface, and wherein the second structural element comprises a skin of the wing or the control surface.

18. The flexure of claim 17, wherein the flexure defines an eyelet proximate the second portion of the flexure, and wherein a fastener secures the skin of the wing or the control surface to the flexure through the eyelet.

19. The flexure of claim 18, wherein the flexure enables relative movement between the skin of the wing or the control surface and the rib of the wing or the control surface in a direction parallel to an axis along which the rib extends.

20. The flexure of claim 16, wherein the flexure resists bending in the first plane and the second plane, and is configured to bend along a direction orthogonal to the third plane.

* * * * *